United States Patent [19]

Lynde

[11] 3,740,090
[45] June 19, 1973

[54] SAFETY LOCK ASSEMBLY
[76] Inventor: Edward A. Lynde, Jordan Valley, Oreg. 97910
[22] Filed: Sept. 29, 1971
[21] Appl. No.: 184,865

Related U.S. Application Data
[62] Division of Ser. No. 56,843, July 21, 1970.

[52] U.S. Cl. .......................... 296/35 R, 180/89 A
[51] Int. Cl. ........................................... B62d 33/06
[58] Field of Search ............ 296/28 C, 35 R, 35 A; 180/89; 292/144

[56] References Cited
UNITED STATES PATENTS

| 2,749,175 | 6/1956 | King et al. ........................ 298/38 X |
| 3,163,306 | 12/1964 | Bennett et al. ................... 296/35 A |
| 1,064,582 | 6/1913 | Wippler ............................ 296/35 A |
| 2,344,826 | 3/1944 | Gresley ............................ 292/144 X |
| 3,397,910 | 8/1968 | Schmidt ........................... 180/89 X |
| 3,504,814 | 4/1970 | McCleary ...................... 296/35 A X |

FOREIGN PATENTS OR APPLICATIONS
1,120,929  12/1961  Germany ........................... 292/144

Primary Examiner—Leo Friaglia
Assistant Examiner—John A. Pekar
Attorney—Spencer & Kaye

[57] ABSTRACT

A safety lock assembly for locking together in a predetermined relative position two members which are arranged for movement relative to one another, displacement means being provided for moving the members relative to one another out of the predetermined position and the safety lock assembly being normally maintained in a locking position and being arranged for movement out of the locking position under the influence of driving means, the driving means and displacement means being connected to a common power source and the driving means being actuated when the power from the source is lower than that required for actuating the displacement means.

9 Claims, 6 Drawing Figures

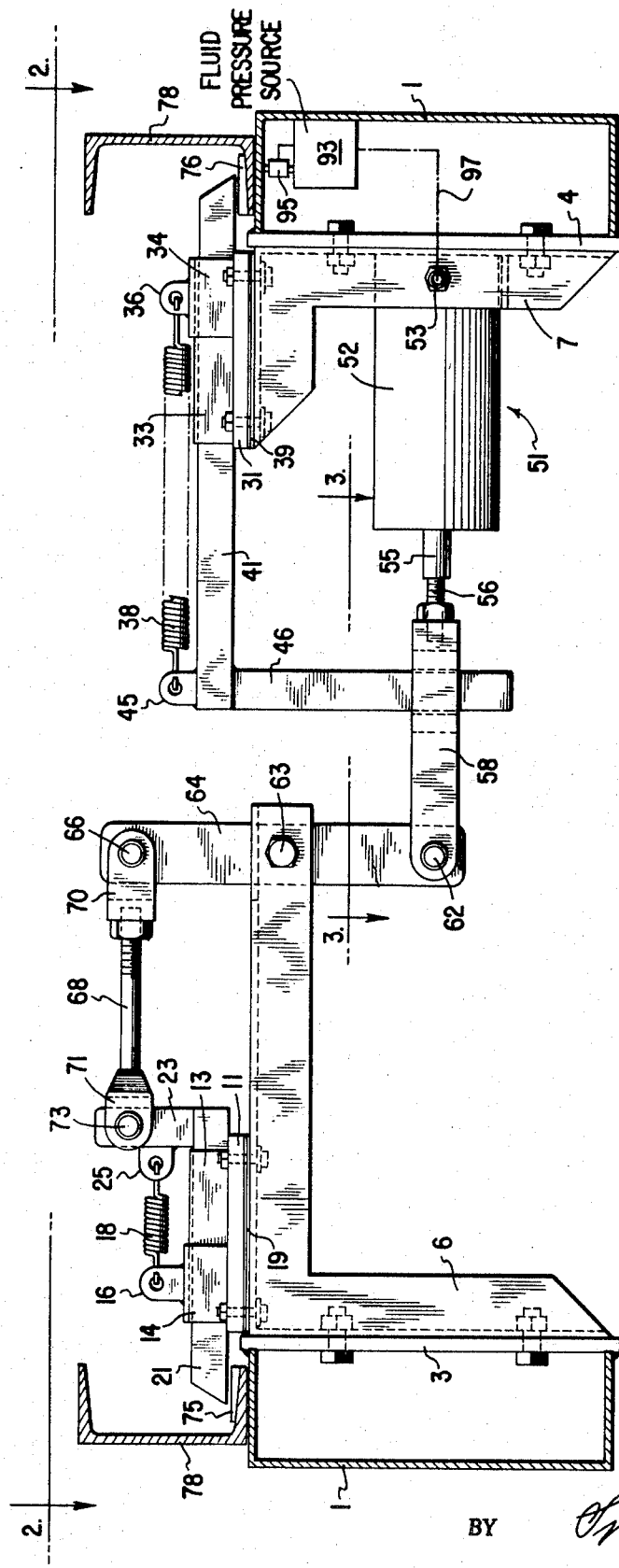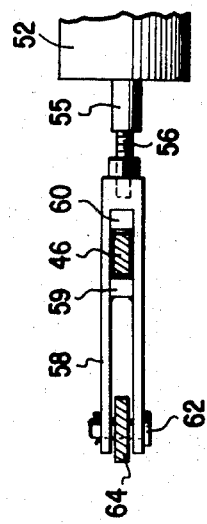

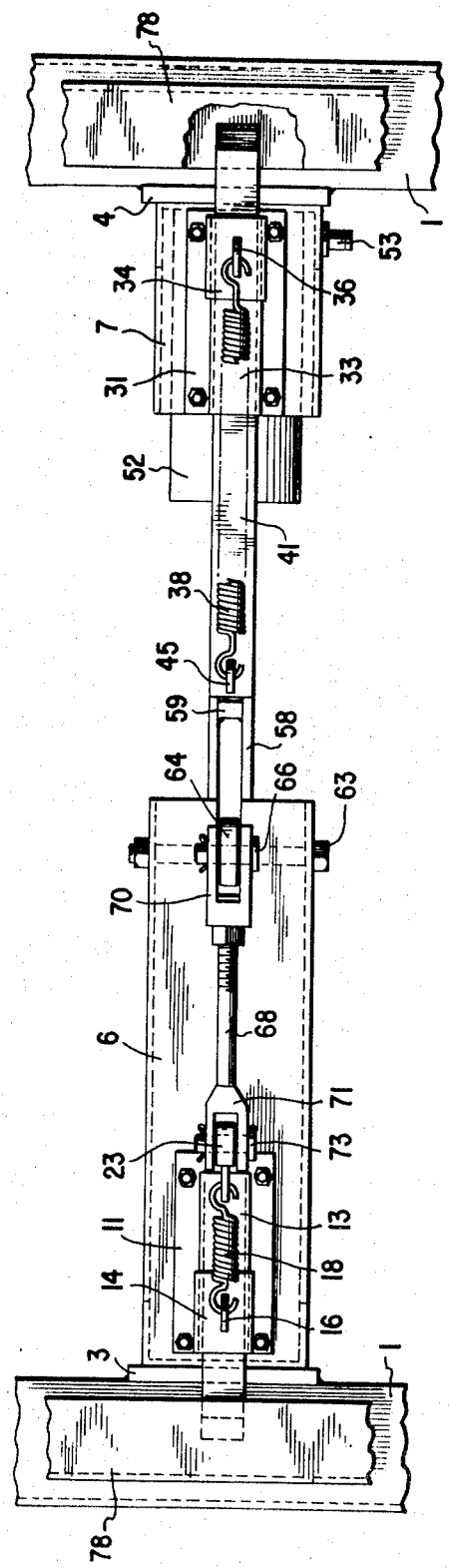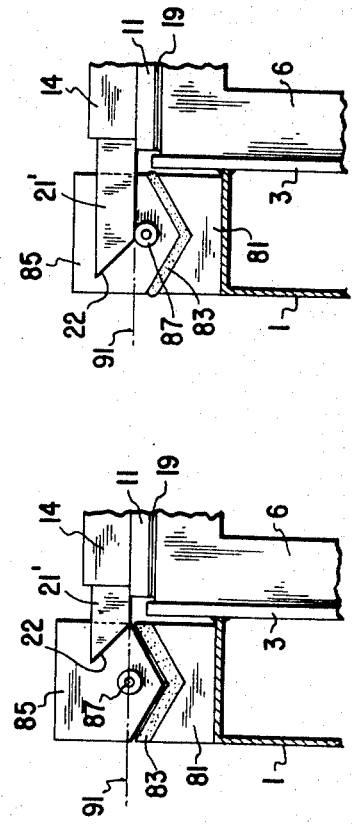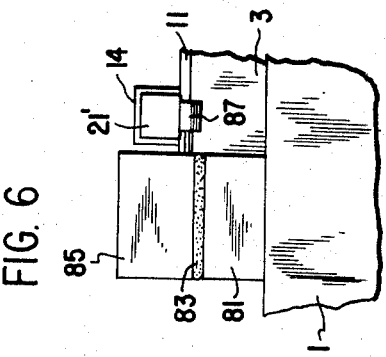

SAFETY LOCK ASSEMBLY

CROSS REFERENCE TO RELATED APPLICATION

This application is a division of application Ser. No. 56,843, filed July 21, 1970.

BACKGROUND OF THE INVENTION

The present invention relates to safety lock assemblies, particularly for locking a first member of a vehicle in a predetermined position with respect to a second member thereof.

There exist many types of industrial, construction and commercial apparatus and vehicles whose operation involves such a relative movement. Typical examples are dump bed trucks in which the bed is to be raised relative to the truck frame and tilt cab trucks in which the cab is to be pivoted relative to the truck frame. These raising operations are to be performed only at certain times and it is essential that such movement not occur accidentally or inadvertently because this could lead to serious injury to the operating personnel or innocent bystanders or substantial damage to the raising and lowering mechanism or the contents of the vehicle.

In order to prevent such accidental movements, it has heretofore been the practice to provide such apparatus or vehicles with manually operated mechanical locks which must be released before the desired movement can occur. While these locks provide the desired protection against accidents as long as they are correctly used, it is highly possibly, and in fact not uncommon, for the operator to forget to secure the lock after the movable member has been returned to its normal position or to forget to release the lock before operating the mechanism which moves the member to its raised position. In the former case, there exists the obvious danger that the movable member will become accidentally raised when the vehicle is in motion or when it is otherwise desired that the member not be raised, while in the latter case activation of the raising mechanism will very likely result in serious damage to the truck bed, the frame, or the raising mechanism itself.

In addition, the need for manually operating the lock mechanism increases the total time required for raising and lowering the movable member.

Moreover, in the known safety locks, there is no provision for adjusting the position of the locking elements relative to the member being secured. As a result, when the vehicle is in motion, the movable member will experience a certain degree of bounce and twist and apply torque which can result in frame fatigue and unnecessary wear on the various elements on the raising mechanism.

SUMMARY OF THE INVENTION

It is a primary object of the present invention to overcome the above-noted drawbacks and difficulties.

Another object of the invention is to eliminate the need for manually operating a safety lock assembly.

A more specific object of the invention is to automatically control the safety lock assembly so that it will always be in the desired position.

Yet another object of the invention is to prevent the safety lock from accidentally becoming unlocked even if the active member for operating the lock should malfunction.

Still another object of the invention is to facilitate the adjustment of the safety lock to cause it to be positioned properly with respect to the member being secured.

These and other objects according to the invention are achieved by the provision of a safety lock assembly including a locking bolt mounted for movement between a locking position and an unlocking position, passive biassing means connected for normally urging the bolt into its locking position and active driving means connected for moving the locking bolt into its unlocking position. According to a preferred embodiment of the invention, the active driving means receives its driving power from the same source as the mechanism for raising and lowering the member being secured and is arranged to be actuated when the power from the source is lower than that required for initiating the raising of the member. This assures that the locking bolt always becomes automatically unlocked before the raising of the movable member commences and will not return to its locking position until the movable member has been returned to its lowered position.

According to another principal feature of the present invention, a resilient piece is interposed between the two members which are to move relative to one another and the movable member is provided with a locking bolt engaging element which cooperates with the locking bolt so as to force the movable member toward the other member so as to compress the resilient piece as the bolt moves into its locking position. This assures that the members will be connected together in a manner which prevents relative movement, and particularly vibrations, therebetween.

BRIEF DESCRIPTION OF THE DRAWINGS

FIG. 1 is an elevational view, partly in cross section, of a first preferred embodiment of the invention.

FIG. 2 is a plan view taken along the line 2—2 of FIG. 1.

FIG. 3 is a cross-sectional detail view taken along the line 3—3 of FIG. 1.

FIG. 4 is an elevational view, partly in cross section, of a second embodiment of the invention with the locking bolt in its unlocking position.

FIG. 5 is a view similar to that of FIG. 4 showing the locking bolt in its locking position.

FIG. 6 is a side view of the embodiment of FIGS. 4 and 5 with the locking bolt in its locking position.

DESCRIPTION OF THE PREFERRED EMBODIMENTS

FIGS. 1, 2 and 3 illustrate one preferred embodiment of the safety lock assembly according to the invention for locking a pivotally mounted bed, such as a dump bed, in its lowered position on a truck or other vehicle. The safety lock assembly is mounted on the frame 1 of the truck or other vehicle by means of two vertical plates 3 and 4 welded to truck frame members at respectively opposite sides of the truck.

The base of the lock assembly itself is composed of two right-angle channel members 6 and 7 each bolted to a respective one of the vertical plates 3 and 4.

On the upper surface of channel member 6 there is disposed a guide assembly composed of a support base 11 carrying a guide tube 13 and a reinforcing tube 14 surrounding the outer end of guide tube 13. Tubes 13 and 14 may be welded or otherwise permanently secured to base 11. Reinforcing tube 14 carries an upstanding ear 16 provided with an opening for holding one end of a first tension spring 18. If necessary, flat shims 19 can be disposed between the support base 11 and the upper surface of channel member 6 for adjusting the height of the tubes 13 and 14.

A first locking bolt 21 is mounted to extend through guide tube 13. Bolt 21 is dimensioned to be closely matched to the internal lateral dimensions of tube 13 so as to experience a minimum of lateral play with respect thereto. At its inner end, with respect to the sides of the truck, bolt 21 carries an upstanding connecting element 23 which may be welded to, or integral with, bolt 21. Connecting element 23 is provided with an ear 25 having an opening in which is held the other end of tension spring 18.

Mounted on the upper surface of the other channel member 7 is a second guide assembly substantially identical with the previously-described guide assembly and composed of a support base 31 carrying a guide tube 33 and a reinforcing tube 34. Tubes 33 and 34 are mounted on the support base 31 in the same manner as the tubes 13 and 14 of the previously-described guide assembly. The support base 31 is rigidly attached to channel member 7 by means of bolts and between support base 31 and channel 7 there can be provided one or more shims 39 for adjusting the height of the tubes 33 and 34.

At the upper surface of reinforcing tube 34 there is disposed an ear 36 provided with an opening for supporting one end of a second tension spring 38.

A second locking bolt 41 extends through tube 33. While bolt 41 is slidable in tube 33, the bolt is dimensioned to closely match the internal dimensions of tube 33 so as to minimize lateral play between the bolt and the tube.

At its inner end, with respect to the sides of the truck, bolt 41 carries an upstanding ear 45 provided with an opening for supporting the other end of tension spring 38. Also at its inner end, bolt 41 carries a projection 46 extending downwardly from its lower surface. Both ear 45 and projection 46 may be integral with, or welded to, bolt 41 or may be rigidly attached thereto in any other suitable manner.

Rigidly mounted on the inner vertical surface of channel member 7 is the cylinder 52 of a hydraulic ram unit 51. This cylinder can be rigidly attached to channel member 7 in any suitable manner, as by bolting or welding, or by means of a suitable auxiliary support unit rigidly connected to channel member 7 and holding the cylinder 52 in such a manner as to permit the cylinder to be removed for maintenance or replacement. The cylinder 52 is provided with an inlet 53 for delivering pressure fluid to the interior of the cylinder, the inlet 53 extending through the side of channel member 7 and being readily accessible for the attachment of a tube for supplying fluid to the interior of the cylinder.

Within cylinder 52 there is disposed the usual piston rigidly connected to a piston rod 55 projecting out of the inner end of the cylinder. The ram unit 51 could be of any commercially available type and, for a lock assembly to be used on a medium sized dump bed truck, could be of the type which produces a force of the order of 1,250 pounds and which is provided with a piston having a two-inch travel.

Piston rod 55 is provided with a threaded end portion 56 connected to the base of a clevis 58 by means of a bolt forming a part of the clevis and threadedly engaging the threaded end portion 56 to permit adjustment of the position of the clevis 58 in the direction of the axis of piston rod 55. The bolt connected to projection 56 is preferably permanently attached to the base of the clevis in such a manner as to be rotatable therewith. Alternatively, the bolt could be stationary with respect to the clevis while the piston rod 55 is rotatable for adjusting the location of the clevis relative to the piston rod.

The projection 46 extending from locking bolt 41 extends downwardly through the clevis 58, between its legs, and the position of projection 46 relative to the length of clevis 58 is fixed by two guide pieces 59 and 60. This arrangement permits projection 46 to move vertically with respect to clevis 58, to allow the vertical position of the locking bolt 41 to be varied by changing the number or thickness of the shims 39 disposed between channel member 7 and support base 31, while assuring that projection 46, and thus locking bolt 41 and ear 45, will move as a unit with clevis 58 in the direction of the longitudinal axis of the clevis-piston rod unit.

The ends of the clevis opposite the hydraulic ram unit 51 are provided with openings for receiving a pivot pin 62 whose end is provided with a hole through which is inserted a cotter pin for holding pin 62 in place.

One end of a lever bar 64 is pivotally mounted on pin 62 so as to render the bar pivotal with respect to clevis 58. Bar 64 is pivotally mounted at its center on the inner extremity of channel member 6 by means of a pivot bolt 63. The upper surface of channel member 6 is provided with a cut-out for the passage of bar 64.

Connected between bar 64 and connecting element 23 of locking bolt 21 is a connecting rod 68 having connecting clevises 70 and 71 connected to its ends. Rod 68 has one end threaded to mate with a bolt forming part of the clevis 70, the bolt preferably being rotatable with respect to the clevis. This permits the effective length of rod 68 to be adjusted. Clevis 70 is pivotally connected to the other end of bar 64 by means of a pivot pin 66 held in place by an associated cotter pin. Clevis 71 at the other end of rod 68 can be integral with or welded to rod 68, or otherwise permanently attached, and is pivotally connected to connecting element 23 of locking bolt 21 by means of a pivot pin 73 held in place by an associated cotter pin.

Bar 64 is preferably mounted on channel member 6 so that pins 62 and 66 are an equal distance from pivot bolt 63. This assures that locking bolts 21 and 41 will always travel equal distances when the safety lock is released. The locking bolts 21 and 41 are disposed to extend above wedge washers 75 and 76, respectively, each permanently attached to the lower flange of a respective one of the side frame members 78 of the dump bed, for preventing the bed from being accidentally raised.

In FIGS. 1, 2 and 3 the safety lock assembly is shown in its fully locking position with the locking bolts 21 and 41 extending outwardly toward the sides of the truck and covering substantial portions of the washers 75 and 76, respectively. The locking position of bolts 21 and 41 is determined either by the abutment of connecting element 23 against the inner end of guide tube 13 or by the springs 18 and 38 being fully compressed.

The locking bolts 21 and 41 are normally held in the illustrated position by the action of tension springs 18 and 38. If desired, the spring 18 could be eliminated and spring 38 would be sufficient to hold both locking bolts in their closed position and to move the locking bolts to this position after the fluid pressure in cylinder 52 has dropped to a low value. When a ram unit 51 of the type described above is employed, the spring 38 could be of a type producing a fifty pound pull. Spring 18, if employed, could have a lower pulling force. When spring 18 is omitted, spring 38 will act on bolt 21 through the linkage composed of projection 46, clevis 58, bar 64, rod 68 and connecting element 23.

As long as the dump bed remains in its lowered position, as illustrated, locking bolts 21 and 41 do not contact washers 75 and 76, respectively. The necessary shims 19 and 39 can be disposed between bases 11 and 31, respectively, and their associated channel members to establish this relationship. This assures that when the bed is lowered, no resistance will be offered to the movement of the locking bolt into the locking position illustrated, or to the movement of the bolts out of this locking position preliminary to the raising of the dump bed. However, the locking bolts will prevent the dump bed from accidentally moving into its raised position.

The fluid inlet 53 for the cylinder 52 is connected to a fluid pressure source 93 by line 97. It is most preferable that the inlet 53 be connected to the source of fluid pressure for the hydraulic system 95 provided for actually raising and lowering the dump bed. The ram unit 51 is designed to drive its associated piston, and hence piston rod 55, when the fluid pressure within the cylinder 52 reaches a value lower than that required for initiating the raising of the dump bed. Correspondingly, the ram unit 51 is designed so that springs 18 and 38, or spring 38 alone, will overcome the force produced by the ram when the fluid pressure in the cylinder is lower than the hydraulic pressure value at which the previously raised dump bed will return to its lowered position, which is the position illustrated in FIGS. 1–3. This means that the ram unit 51 will act, by displacing clevis 58, to move locking bolts 21 and 41 into their retracted positions, where they are clear of washers 75 and 76 and frame members 78 before the hydraulic system begins to raise the dump bed and that the locking bolts 21 and 41 will be permitted to return to their locking position only after the dump bed has been fully lowered.

As a result, it is not necessary to perform a separate, manual, operation to release the safety lock assembly or to subsequently return the assembly to its locking position.

Moreover, the assembly requires a positive hydraulic pressure to move into its release position. As a result, any malfunctions developing in the cylinder or breaks in the line delivering fluid to the cylinder will cause the assembly to remain in its locked position rather than in its released position.

Assuming that the fluid inlet 53 for the ram unit 51 is connected to the hydraulic power source for lifting and lowering the dump bed, when it is desired to lift the bed from the position illustrated, fluid is delivered to both unit 51 and the system 95 for raising and lowering bed. The relation between the driving force of ram unit 51 and the restraining, or locking, force of springs 18 and 38 is such that the ram unit will generate sufficient force to drive piston rod 55 against the spring restraining force when the fluid pressure in unit 51 is lower than that required to begin raising the dump bed. Therefore, at the start of application of fluid pressure, and before the bed has begun to rise, piston rod 55 is driven to the left with respect to the views of FIGS. 1–3, carrying clevis 58 along with it. Projection 46 and locking bolt 41 move horizontally with clevis 58 to withdraw locking bolt 41 from above washer 76. At the same time, the movement of clevis 58 pivots bar 64 clockwise with respect to the view of FIG. 1, thus moving rod 68 to the right together with element 23 and locking bolt 21. This causes locking bolt 21 to move free of washer 75. The dump bed is now unlocked. The pressure produced by the fluid source continues to rise, thus activating the system for raising the dump bed. As long as the fluid pressure is sufficient to raise the dump bed, or to maintain it in its raised position, the locking assembly with remain in its activated, or released state.

When it is desired to lower the dump bed, the fluid pressure gradually decreases, causing the bed to be lowered. Because of the relationships existing between the system for raising and lowering the bed and the locking assembly, the pressure delivered to the bed drive system will drop to a value at which the bed becomes fully lowered before the pressure in the cylinder 52 reaches a value at which the force produced by springs 18 and 38 overcomes the driving force applied to the piston rod 55. When, after the bed has been fully lowered, the pressure in cylinder 52 drops below such value, springs 18 and 38 become effective to move locking bolts 21 and 41 back into their locking position. The system is now automatically locked and the bed will be prevented from being accidentally raised until it is again desired to perform a raising operation.

FIG. 1 illustrates one possible structural arrangement for the hydraulic systems utilized. According to this arrangement, a hydraulic lifting device 95 is connected between frame 1 and the dump bed frame 78 for producing the desired movement therebetween. The hydraulic inlet for device 95 is connected by a suitable conduit to the fluid pressure source 93. This source is also connected by a suitable conduit to the inlet 53 of ram 51. As noted above, the pressures delivered to units 95 and 51 can be readily adjusted to assure that bolts 21 and 41 will be retracted before the dump bed begins to be raised and that the bolts will not return to their locking position until after the dump bed has been fully lowered.

Turning now to FIGS. 4–6, there is illustrated another utilization of the safety lock assembly according to the invention. In this embodiment, the safety lock assembly is employed for securing the cab of a tilt cab truck in its lowered position. The safety lock assembly itself is identical with that illustrated in FIGS. 1–3, with the exception that the outer extremity of each of the locking bolts tapers outwardly from its lower surface to its upper surface, as illustrated for the surface 22 of locking bolts 21' in FIGS. 4 and 5. The operation of the locking bolt assembly is identical with that of FIGS. 1–3.

The arrangement for securing a tilt cab includes a lower mount 81 rigidly secured to the truck frame 1. The upper surface of mount 81 is shown to have a V-shaped configuration, although other configurations could also be employed. Permanently attached to the upper surface of mount 81 is a rubber bushing 83. A cab mount 85 rigidly secured to the tilt cab has its lower surface formed to mate with the bushing 83, whose upper surface conforms substantially with the upper surface of mount 81. Mount 85 carries a freely rotatable roller 87 arranged to engage with locking bolt 21'.

An arrangement identical to the elements 81, 83, 85 and 87 is disposed at the other side of the truck to cooperate with a second locking bolt corresponding to locking bolt 41 and having a tapered end comparable to that of bolt 21'. The cab is mounted on the truck to tilt about a horizontal axis parallel to the plane of the views of FIGS. 4 and 5 and perpendicular to the plane of the view of FIG. 6.

When the cab is in its lowered position and the locking bolts of the locking assembly are in their retracted position, as illustrated in FIG. 4, cab mount 85 rests on bushing 83. At this time, the mount 85 actually contacts the bushing, although a small space is shown between the mount and the bushing in FIG. 4 for the sake of clarity. When the mount 85 rests on bushing 83 and bolt 21' is in the retracted position illustrated in FIG. 4, the plane 91 defining the lower surface of bolt 21' is slightly below the highest point of roller 87. For example, in the case where the bushing has a thickness of about one inch, the plane 91 can be approximately one-quarter inch below the highest point on the roller.

When the bolt 21' is then moved toward the locking position illustrated in FIG. 5, tapered end surfaced 22 first comes into contact with roller 87. As the bolt moves to its locking position, first the lower part of extremity 22 and then the lower horizontal surface of bolt 21' ride on roller 87, thus forcing mount 85 downwardly and compressing bushing 83.

Because the mount 85 is being positively forced against lower mount 81 and rubber bushing 83 is being compressed, a solid connection between the cab and the truck is assured and vibrations between the mounts is prevented. The degree to which the rubber bushing 83 is compressed can be readily adjusted by a proper selection of the total thickness of the shims 19. While the bolt 21' is performing the above-described operation, the corresponding bolt at the other side of the locking assembly is performing an identical operation with respect to the mounts and rubber bushing disposed at the other side of the truck.

The illustrated arrangement has advantages similar to those described above in that it provides a secure, positive lock for the tilt cab and, when the fluid inlet for the locking assembly cylinder is connected to the hydraulic system for raising and lowering the tilt cab, in those cases where the cab is provided with such an arrangement, a high degree of safety against accidental tilting of the cab is produced and the need for a separate manual operation to lock and unlock the cab is eliminated.

While the mounts 81 and 85 are shown to be provided with V-shaped mating surfaces, it will be appreciated that these surfaces can have any other desired configuration. However, a configuration similar to that illustrated has the advantage of assuring a proper positioning of the cab relative to the truck. The operation of the locking assembly in the arrangement illustrated in FIGS. 4–6 is identical with that previously described with reference to FIGS. 1–3.

It will be readily appreciated that while the locking assembly according to the present invention has been shown in association with certain vehicle structures, the safety lock assembly according to the invention is readily adaptable to many other vehicle-mounted and stationary structures. In general, the assembly can be used for locking any unit which is arranged to be selectively movable with respect to another unit. However, the safety lock assembly according to the invention is particularly suited for locking movable structures which are hydraulically or pneumatically driven. In addition, because of the high reliability and light weight of the safety lock assembly according to the invention it is particularly well suited for use in vehicles, where light weight is of great importance.

It will be understood that the above description of the present invention is susceptible to various modifications, changes and adaptations, and the same are intended to be comprehended within the meaning and range of equivalents of the appended claims.

I claim:

1. For locking a tilt mounted cab which is movable with respect to a truck frame on which said cab is mounted for pivotal movement relative thereto, a safety lock assembly mounted for locking said cab in a predetermined position relative to said truck frame, said assembly comprising: support means rigidly connectable to said truck frame; a locking bolt mounted on said support means for movement relative thereto between a first position in which it locks said cab in said predetermined position and a second position in which it offers no impediment to movement of said cab away from said predetermined position; passive biasing means connected between said support means and said locking bolt for normally urging said bolt into its said first position; active driving means connected to said locking bolt and arranged to be actuated for overcoming the biasing force produced by said biasing means so as to move said locking bolt into its said second position; a first mount rigidly connected to said truck frame; a second mount rigidly connected to said cab to be disposed directly above said first mount; a resilient, elastic bushing permanently connected to one of said mounts and arranged to contact the other of said mounts when said cab is in its lowered position; and bolt engaging means mounted on one said mount and having a portion disposed to lie in the path of travel of said locking bolt when said cab is in its lowered position and said bolt is in its said second position and said bolt being arranged for deflecting said engaging means so as to compress said bushing between said mounts as said bolt moves into its said first position.

2. An arrangement as defined in claim 1 wherein there are two locking bolts, each disposed to a respective side of said truck frame.

3. An arrangement as defined in claim 2 wherein said driving means comprises a linkage arrangement for moving said bolts into their said second position by moving them toward one another and for permitting said bolts to move into their said first position by moving away from one another under the influence of said biasing means.

4. An arrangement as defined in claim 3 wherein said linkage arrangement comprises a first linkage for moving one said bolt in the direction of the movement produced by said driving means and a second linkage for moving the other said bolt in the direction opposite to the direction of movement produced by said driving means.

5. An arrangement as defined in claim 4 wherein said first linkage comprises means for permitting the position of said one bolt to be adjusted in a direction normal to the direction of the movement produced by said driving means.

6. An arrangement as defined in claim 1 wherein said driving means are composed of a fluid operated ram unit having a driven member connected to said bolt, and further comprising: fluid operated displacement means connected between said tilt mounted cab and truck frame for producing relative movement therebetween; and a fluid pressure source connected to said displacement means for controlling the movement produced thereby and connected to said ram unit for driving said driven member.

7. An arrangement as defined in claim 6 wherein said driven member of said ram unit is arranged to overcome the biassing force of said biassing means when the fluid pressure from said source is lower than that required for actuating said displacement means.

8. An arrangement as defined in claim 1 further comprising: movement producing means connected between said tilt mounted cab and said truck frame; a driving power source connected to said driving means for producing a first force sufficient to move said locking bolt into its said second position and connected to said movement producing means for producing a second force sufficient to move said first member away from said predetermined position, the power from said source required for producing said first force being lower than that for producing said second force.

9. An arrangement as defined in claim 1 wherein said support means are rigidly connectable to said truck frame.

* * * * *